Aug. 14, 1923.
W. J. COMBS
SIGNAL FOR VEHICLES
Filed July 21, 1922
1,465,210
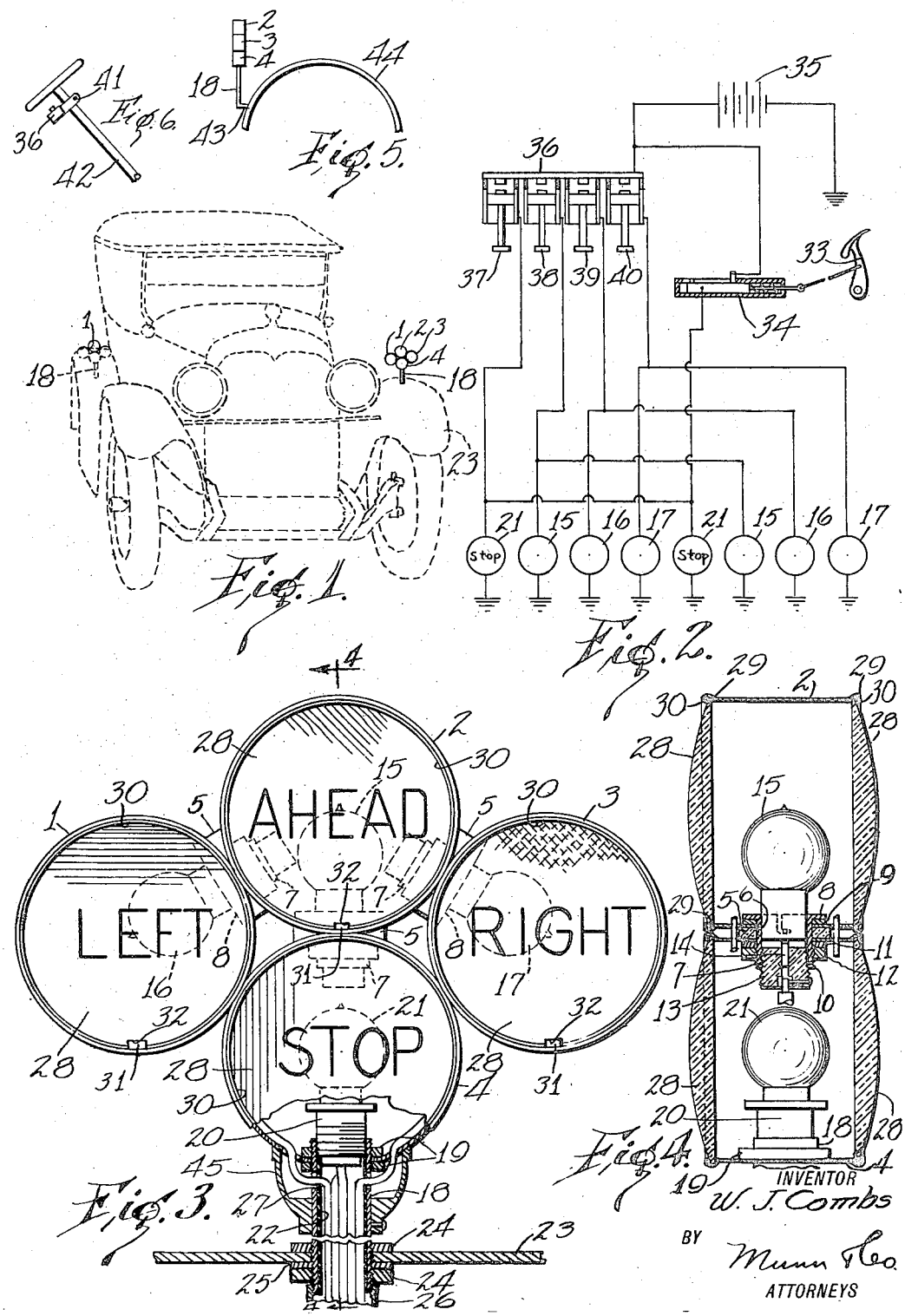
INVENTOR
W. J. Combs
BY
Munn & Co.
ATTORNEYS Patented Aug. 14, 1923.

1,465,210

UNITED STATES PATENT OFFICE.

WILLIAM JAMES COMBS, OF OTTERBEIN, INDIANA, ASSIGNOR OF THIRTY PER CENT TO WILLIAM J. McKONE AND THIRTY PER CENT TO CHARLES T. COMBS, BOTH OF OTTERBEIN, INDIANA.

SIGNAL FOR VEHICLES.

Application filed July 21, 1922. Serial No. 576,552.

*To all whom it may concern:*

Be it known that I, WILLIAM JAMES COMBS, a citizen of the United States, and a resident of Otterbein, in the county of Tippecanoe and State of Indiana, have invented a new and useful Improvement in Signals for Vehicles, of which the following is a full, clear, and exact description.

My invention relates to improvements in signals for vehicles and it consists in the combinations, constructions, and arrangements herein described and claimed.

An object of my invention is to provide a signal for automobiles or the like, which is very simple in construction and which is inexpensive to manufacture.

A further object of my invention is to provide a device of the type described which has means for telling the driver of an approaching vehicle the direction in which the vehicle to which the device is attached is going.

A further object of my invention is to provide a device of the type described which may be readily secured to the fender of an automobile with but slight alterations being necessary in the latter.

A further object of my invention is to provide a device of the type described which consists of the minimum number of parts and which is not likely to easily get out of order.

A further object of my invention is to provide a device of the type described which has novel means for securing the glasses or lenses in position.

Other objects and advantages will appear in the following specification, and the novel features of the invention will be particularly pointed out in the appended claim.

My invention is illustrated in the accompanying drawings, forming part of this invention in which Figure 1 is a perspective view of an automobile showing the device operatively secured thereto, Figure 2 is a wiring diagram of the circuits employed in the device, Figure 3 is a front elevation of the device, portions thereof being broken away, Figure 4 is a section along the line 4—4 of Figure 3.

Figure 5 is a side view of the device as shown applied to an automobile fender, and Figure 6 is a diagrammatic view of the switch shown attached to a steering wheel.

In carrying out my invention I provide four cylindrical casings, 1, 2, 3, and 4. These casings are of the same diameter and are secured to each other in the manner clearly illustrated in Figure 3 of the drawings. The casings are secured to each other by means which also carry electric lights. This means is clearly shown in Figure 4.

It will be noted that the casings bear against resilient washers 5, and that the casings have aligned openings 6, through which the electric light sockets 7 are disposed. Each socket 7 has a flange 8 which is separated from the casing by a washer 9. The other end of the socket 7 is threaded exteriorly as at 10, and is adapted to receive the spring washer 11 and the nut 12. The wire carrying terminal 13 is disposed within the socket 7 and has a contact terminal 14, which is adapted to abut the lower end of the light 15, thereby completing the circuit. The socket just described is ordinary in construction, and forms no part of my invention, except in so far as it co-operates with the other elements of the device.

In the present form of the device, three lights and sockets, 15, 16, and 17 secure the casings 1, 2, 3, and 4 together. The lower casing 4 has a supporting pipe 18 disposed therein, the pipe being secured in place by lock-nuts 19, (see Figure 3). The pipe 18 is internally threaded for a short distance, and it is adapted to receive the socket 20, or a light 21. The interior of the pipe 18 is insulated by means of an insulating sleeve 22. The lower end of the pipe 18 is projected through an opening in the fender 23, and is secured in place by lock-nuts 24, and a spring washer 25. A cable 26 is secured to the lower end of the pipe 18 and is adapted to convey the wires which are connected to the lights.

As clearly shown in Figure 3, the pipe 18 has openings 27 through which the electrical wires extend. The casings 1 to 4 inclusive also have openings therein at the required places, so as to permit the wires to be secured to their respective sockets. Where the wires are passed through the casings or other metal parts, they are provided with insulating sleeves so as to prevent the short circuiting of the device.

The openings of the casings 1 to 4 inclusive are adapted to receive glasses 28. The ends of the casings are curved so as to provide annular grooves 29, (see Figure 4). The grooves 29 are so constructed that the outer edges thereof are adapted to receive the glasses, but the inner edges thereof provide seats upon which the glasses are disposed. Wire springs 30 are disposed in the grooves 29, and are adapted to project over the outer faces of the glasses so as to securely hold the latter in position. It will further be observed from Figure 3 that the casings have inwardly projecting lugs 31, which are received in recesses 32 in the glasses. This construction prevents the glasses from rotating after they are once placed within the casings.

The glasses have different words printed thereon, and are also colored differently with respect to each other. It will be noted from Figure 3 that the glasses in the casing 1, have the word "Left" printed thereon, and are colored blue. In like manner the glasses in the casings 2, 3, and 4 are provided with the words "Ahead," "Right," and "Stop" respectively. These glasses 2, 3, and 4 are colored green, orange, and red, respectively. In this manner, the different colored lights will tell the approaching car in which direction the car, to which the device is attached, is going, even though the driver is unable to read the words on the glasses.

In Figure 2 I have shown a foot-brake 33 as being operatively connected to a switch 34, which in turn is in electrical connection with a source of current 35, and the light 21 in the casing 4. It will therefore be observed that when the foot-brake is actuated, the light in the casing 4 will illuminate the glasses, and tell the driver of the approaching vehicle that the vehicle ahead is stopping. In Figure 1 I have shown two clusters of lights or two devices as being secured to the front left fender of the car, and to the right rear fender. These devices are connected to each other so that the lights in both devices are illuminated simultaneously, i. e., the word "Stop" in both devices will be illuminated at the same time, the word "Right" will be illuminated at the same time, etc. The controlling switch, 36, indicated diagrammatically in Figures 2 and 6, is in electrical connection with the lights in the casings 1 to 4 inclusive. This switch is provided with four push-buttons 37, 38, 39, and 40, which are adapted to be held in closed or open position. The switch 36 is constructed so as to dispose the push-buttons in a cluster, the push-buttons being arranged in identically the same manner as the casings 1 to 4 inclusive. In this manner the driver of the car can actuate the desired switch without his having to know the name of the switch he is actuating. This construction provides a simple means whereby the driver can instantly actuate the desired switch without having to glance at the switch before actuating the latter. The control switch 36 is secured to a bracket 41, which in turn is connected to the steering wheel 42 of the automobile.

From the foregoing description of the various parts of the device, the operation thereof may be readily understood. In Figure 2 I have shown the wiring diagram of the circuits employed with two of the devices connected to the controlling switch 36.

It will be observed that the push-buttons 37 to 40 inclusive are in electrical connection with a source of current 35, and are also in electrical connection with their respective lights. The foot-brake 33 and the push-button 37 are connected to the same light, i. e., the stop-light. In this way, the stop-light may be lit either by actuating the push-button 37, or operating the foot-brake 33. In case the foot-brake should get out of order, it is obvious that the push-button 37 may be actuated to light the light 21.

In some cars, the body portion of the car extends over a portion of the rear fender. In this case, the light 18 is provided with an elbow 43, which permits the pipe to be secured to the rear fender 44, adjacent to the lower rear edge thereof, (see Figure 5). When the cluster of lights is disposed in this position, they will not interfere with the body of the car. If, however, the body of the car does not extend over the rear fender, the cluster of lights may be disposed on top of the fender, as is the case when the cluster is disposed on the front fender.

The driver of the automobile to which the device is attached can quickly tell the approaching car in which direction he intends to go, by merely actuating one of the push-buttons 37 to 40 inclusive. If, for instance, he wishes to come to a dead stop, he can either apply his foot-brake 33, or actuate the push-button 37, whereupon the light 21 in the casing 4 will illuminate the word "Stop." As heretofore stated, the glass in casing 4 is red, which denotes danger, and quickly attracts the eye of the driver in the approaching automobile. When the driver wishes to go ahead, he can either release the foot-brake 33, or the push-button 37, and close the push-button which is connected with the light 15, in the casing 2. This immediately illuminates the glass with the word "Ahead" marked thereupon. This glass is colored green, which is the common signal for right of way. In the same manner, the driver can tell the approaching car in which direction he intends to turn by merely lighting the light 16, or 17, which illuminates the word "Left" or the word "Right." The control switch 36 may be connected to one cluster of lights or to two clusters, as is illustrated in the present device.

The device is very simple in construction, since it comprises four casings which may be secured to each other by electric light sockets of ordinary construction. These sockets form a double function, i. e., the carrying of the lights, and the securing of the casings together. The canopy 45 is disposed over the pipe 18, and is adapted to enclose the wires which extend through the openings 27. This canopy is held in place by a set-screw or the like. The device is so constructed that the driver may provide his car with one or more of them. As heretofore stated, the device is inexpensive to manufacture, and is durable and efficient for the purpose intended.

It should be noted that the casings 1, 2, 3, and 4 have lenses or glasses 28 in each end thereof. This construction permits the signals to be readily viewed from the front rear, and sides of the automobile. Moreover the driver can see the signals from his position at the steering wheel, thereby being able to instantly ascertain whether or not he has illuminated the right signal. In this manner, the driver is protected against any accident which might occur through flashing a wrong signal.

I claim:

An automobile signal comprising a plurality of cylindrical casings disposed tangent with respect to each other, electric light sockets connecting certain of the casings at the points of tangency, said sockets being arranged so that each casing has the open end of only one socket projecting therein, an electric light disposed in each casing and being carried by the open end of the socket disposed in the casing, and means for securing said casings to a vehicle.

WILLIAM JAMES COMBS.